(12) United States Patent
Dubé et al.

(10) Patent No.: US 7,389,996 B2
(45) Date of Patent: Jun. 24, 2008

(54) DOLLY FOR MOVING A BENDABLE ROLL OF MATERIAL, SUCH AS A CARPET

(76) Inventors: Jean-Guy Dubé, 147 Isabelle Street, Hull, Quebec (CA) J8Y 5H6; Kamal Roy Nandram, 203 Balmoral Place, Ottawa, Ontario (CA) K1H 1B2

( * ) Notice: Subject to any disclaimer, the term of this patent is extended or adjusted under 35 U.S.C. 154(b) by 270 days.

(21) Appl. No.: 11/256,978

(22) Filed: Oct. 25, 2005

(65) Prior Publication Data

US 2007/0090618 A1 Apr. 26, 2007

(51) Int. Cl.
*B62B 3/02* (2006.01)
*B62B 3/10* (2006.01)

(52) U.S. Cl. .................. 280/35; 280/638; 280/639; 280/651; 280/47.34; 280/47.371; 280/79.11; 280/79.6

(58) Field of Classification Search ............... 280/79.6, 280/47.131, 47.17–18, 47.24, 47.34, 63, 280/35, 47.371, 638–640, 644
See application file for complete search history.

(56) References Cited

U.S. PATENT DOCUMENTS

| | | | | |
|---|---|---|---|---|
| 1,639,801 A | * | 8/1927 | Heise | 296/20 |
| 2,806,708 A | * | 9/1957 | Finstad | 280/655 |
| 2,992,011 A | * | 7/1961 | Becan | 280/654 |
| 3,438,645 A | | 4/1969 | Pounders | 280/41 |
| 3,603,608 A | | 9/1971 | Kirkpatrick | 280/47.13 R |
| 3,785,669 A | * | 1/1974 | Doheny | 280/47.18 |
| 4,023,849 A | * | 5/1977 | Bethlen | 296/20 |
| 4,321,004 A | | 3/1982 | Mills | 414/490 |
| 4,824,313 A | | 4/1989 | Miller | 414/346 |
| 4,865,339 A | | 9/1989 | Rundborg et al. | 280/47.21 |
| 5,181,731 A | | 1/1993 | Gustavsen | 280/47.131 |
| 5,228,716 A | * | 7/1993 | Dahl | 280/651 |
| 5,468,010 A | * | 11/1995 | Johnson | 280/652 |
| 5,489,084 A | | 2/1996 | Gilbert et al. | 254/202 |
| 5,941,543 A | * | 8/1999 | Kazmark, Jr. | 280/47.29 |
| 6,079,777 A | * | 6/2000 | Simmons et al. | 297/217.1 |
| 6,079,941 A | * | 6/2000 | Lee | 414/812 |
| 6,210,095 B1 | | 4/2001 | Hempel et al. | 414/490 |
| 6,217,043 B1 | * | 4/2001 | Chumley | 280/40 |
| 6,283,698 B1 | * | 9/2001 | Lee | 414/537 |
| 6,588,775 B2 | * | 7/2003 | Malone, Jr. | 280/47.18 |
| 6,749,215 B2 | | 6/2004 | Perelli et al. | 280/651 |
| 6,758,482 B2 | * | 7/2004 | Stallbaumer | 280/47.27 |
| 6,871,861 B2 | | 3/2005 | Hernandez, Jr. | 280/32.6 |
| 7,017,940 B2 | * | 3/2006 | Hatfull | 280/652 |
| 2003/0098552 A1 | * | 5/2003 | Hsiao | 280/5.24 |

* cited by examiner

*Primary Examiner*—Christopher Ellis
*Assistant Examiner*—Vaughn T Coolman
(74) *Attorney, Agent, or Firm*—David J. French

(57) ABSTRACT

A dolly for moving a bendable roll of material such as a carpet and bending it to fit into a confined space, such as an elevator, includes a primary section capable of supporting a first portion of the roll and having ground-engaging wheels, and a: secondary section pivotally connected to the primary section and capable of supporting a second portion of the roll. The secondary section is pivotally movable relative to the primary section from a lowered position in which the secondary section provides either as a longitudinal extension of the first portion, or in a raised position with the roll bent. A stop member limits lengthwise movement of the roll along the primary section. A carpet roll resting on the dolly may be bent at a central area by lifting the secondary section to the raised position and applying downwards force on the central area of the roll.

8 Claims, 3 Drawing Sheets

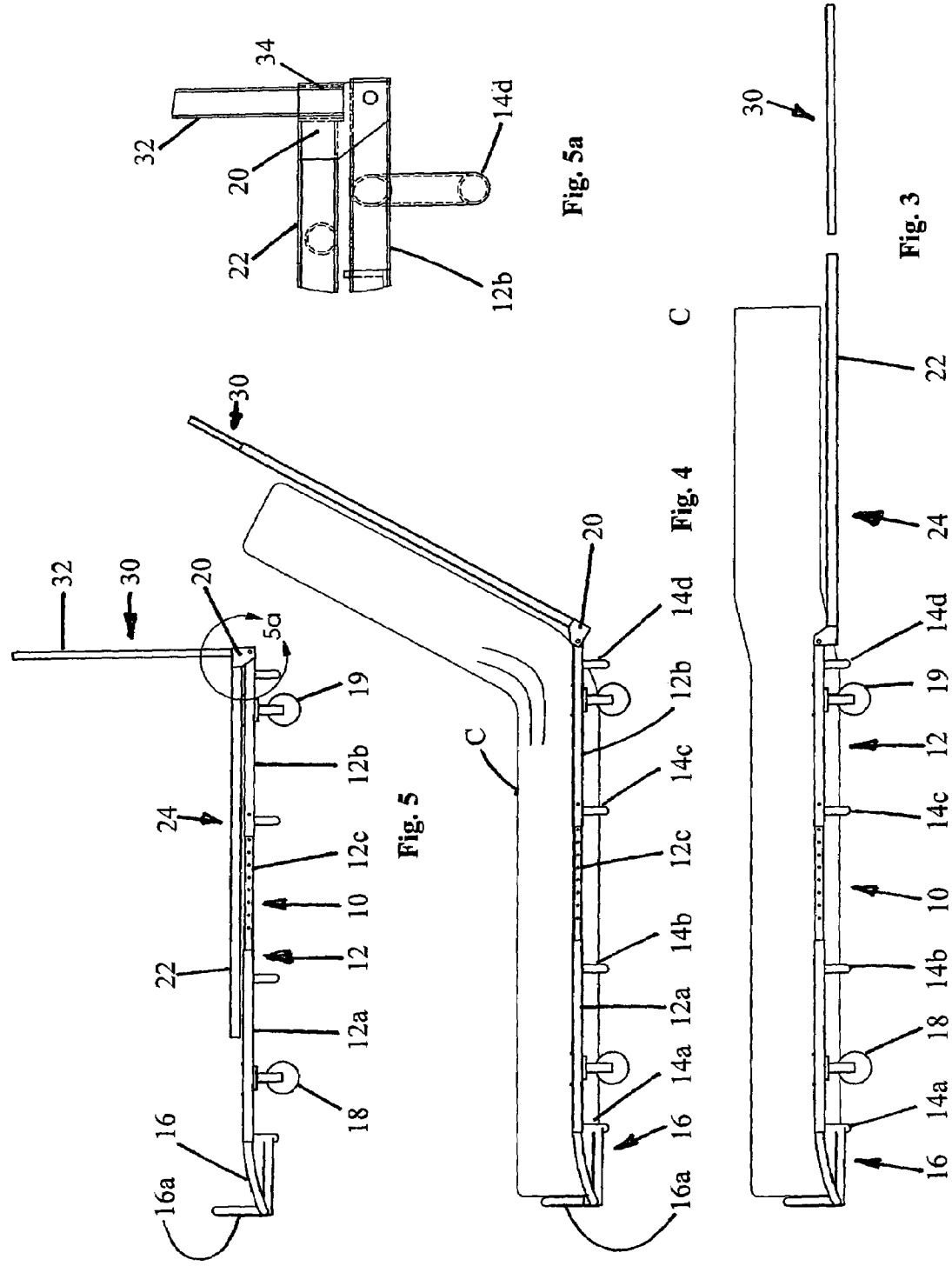

DOLLY FOR MOVING A BENDABLE ROLL OF MATERIAL, SUCH AS A CARPET

FIELD OF THE INVENTION

The present invention relates to dollies or carts used for handling rolls of bendable material, especially carpets, and particularly for the handling of carpet rolls where it is required to move the rolls into a restricted space, such as an elevator.

PRIOR ART

Various dollies or carts for moving carpet rolls are known from the prior art, as shown for example in the following U.S. patents:

U.S. Pat. No. 6,210,095, issued Apr. 3, 2001 to Hempel et al.;
U.S. Pat. No. 5,181,731, issued Jan. 26, 1993 to Gustavsen;
U.S. Pat. No. 4,865,339, issued Sep. 12, 1989 to Rundborg et al.;
U.S. Pat. No. 4,824,313, issued Apr. 25, 1989 to Miller;
U.S. Pat. No. 4,321,004, issued Mar. 23, 1982 to Mills;
U.S. Pat. No. 3,603,608, issued Aug. 12, 1969 to Kirkpatrick; and
U.S. Pat. No. 3,438,645, issued Apr. 15, 1969 to Pounders.

A problem which is not addressed in any of the above patents arises when broadloom carpet, which is commonly sold in 12 foot long rolls, is to be installed in an office building. Usually, such an office building has elevators which are much less than 12 feet in length, typically 8 feet, or less, in length, and the carpet rolls can only be carried in the elevators if they are bent to fit. Hitherto, this has usually been done manually, but the carpet rolls may be heavy, for example up to 400 pounds, and are difficult to bend and to handle in the bent state.

A patent which does address this problem is U.S. Pat. No. 5,489,084 to Gilbert et al. This shows a winch device which can be attached between tubes or rods inserted into opposite ends of a carpet roll and which is used to pull the ends together, thus bending the roll and reducing its effective, or overall, length. It appears that the roll is moved manually; there is no description of any kind of cart or dolly being used with this apparatus.

SUMMARY OF THE INVENTION

The present invention provides a cart or dolly which can be used not only for moving a roll of carpet, typically having a length of 12 feet, but which can also be used to bend the roll to allow it to fit into an elevator or other confined space, and which is also suitable for moving the bent roll.

According to one aspect of the present invention, a dolly for moving a bendable roll of material, for example a carpet, includes:

a primary section capable of supporting a first portion of the roll at several locations along its length, the primary section having first and second ends, and having ground-engaging wheels;

a stop member at the first end of said primary section and adapted to limit lengthwise movement of the roll along the primary section, and a secondary section pivotally connected to the second end of the primary section and capable of supporting a second portion of the roll, said secondary section being pivotally movable relative to the primary section from a lowered position, in which the secondary section provides a longitudinal extension of the primary section, to a raised position; whereby a said roll resting on both sections of the dolly may be bent at a central area of the roll by lifting the secondary section from the lowered to the raised position and applying downwards force on the central area, thus reducing the overall length of the roll.

Preferably, means are provided for holding the secondary section in the raised position. Such means may be a flexible member, such as a chain, connecting the primary and secondary sections, but could also be a rigid member.

The primary section preferably includes side members joined by support means which provide a bed for the roll, the side members being higher than central portions of the bed to assist in holding the roll laterally in place on the dolly. The primary section is preferably at least more than 6 feet in length, or is extendible to more than 6 feet, so as to support the major portion of a 12 foot length carpet roll, and the secondary section preferably supports a substantial portion, for example at least a third, of the roll length. However, in special cases, for example for use in small elevators, a primary section of less than 6 feet may be used, accompanied by manual balancing of the dolly when the carpet roll is horizontal.

The secondary section may be provided with a movable extension member, this latter member being adapted to be positioned selectively in a first position, where it forms an extension of the secondary section to thus provide leverage for raising the secondary section, and in a second position in which it may be used as an upstanding handle for moving the dolly. This movable extension member may be a U-shaped member with legs which, in its first position, fit onto the outer ends of side members of the secondary section to form the said extension, and which, in said second position, fit onto brackets connected to said primary section from which it projects upwardly and is usable for moving the dolly.

In order to reduce the overall length of the dolly for storage, the secondary section can be folded flat onto the primary section. Also, the primary section can include telescoping side members so that it is adjustable in length.

According to another aspect of the invention, a process for bending a carpet roll to enable the roll to fit within a confined space comprises the steps of:

placing the roll on a dolly having a primary section and a secondary section, the primary section being capable of supporting a first portion of the roll, the primary section having first and second ends and having ground-engaging wheels, and the secondary section being pivotally connected to the second end of the primary section and being capable of supporting a second portion of the roll, pivotally lifting the secondary section relative to the primary section from a lowered position, in which the secondary section provides a longitudinal extension of the primary section and supports the second section of the roll, to a raised position, and applying downwards force to a central portion of the roll to cause the roll to bend, whereby the overall length of the roll is reduced to allow it to fit into the confined space.

After the roll has been bent, the secondary section may be held in position by means of rigid or flexible means, such as a chain, connecting the sections.

BRIEF DESCRIPTION OF THE DRAWINGS

A preferred embodiment of the invention will now be described by way of example with reference to he accompanying drawings, in which:

FIG. 1a shows a detail of the hinge connection between the primary and secondary sections.

FIG. 3 is a side view of the dolly in the condition used to carry a carpet roll.

FIG. 4 is a view similar to FIG. 3 but showing the secondary section lifted to bend the carpet roll, and with the movable extension member in place.

FIG. 5 is a side view of the dolly in storage condition, and with the movable extension member engaged with brackets joining the primary and secondary sections.

FIG. 5a is a detail view of the junction between the brackets and the extension member.

DETAILED DESCRIPTION OF THE PREFERRED EMBODIMENT

Figure 1:
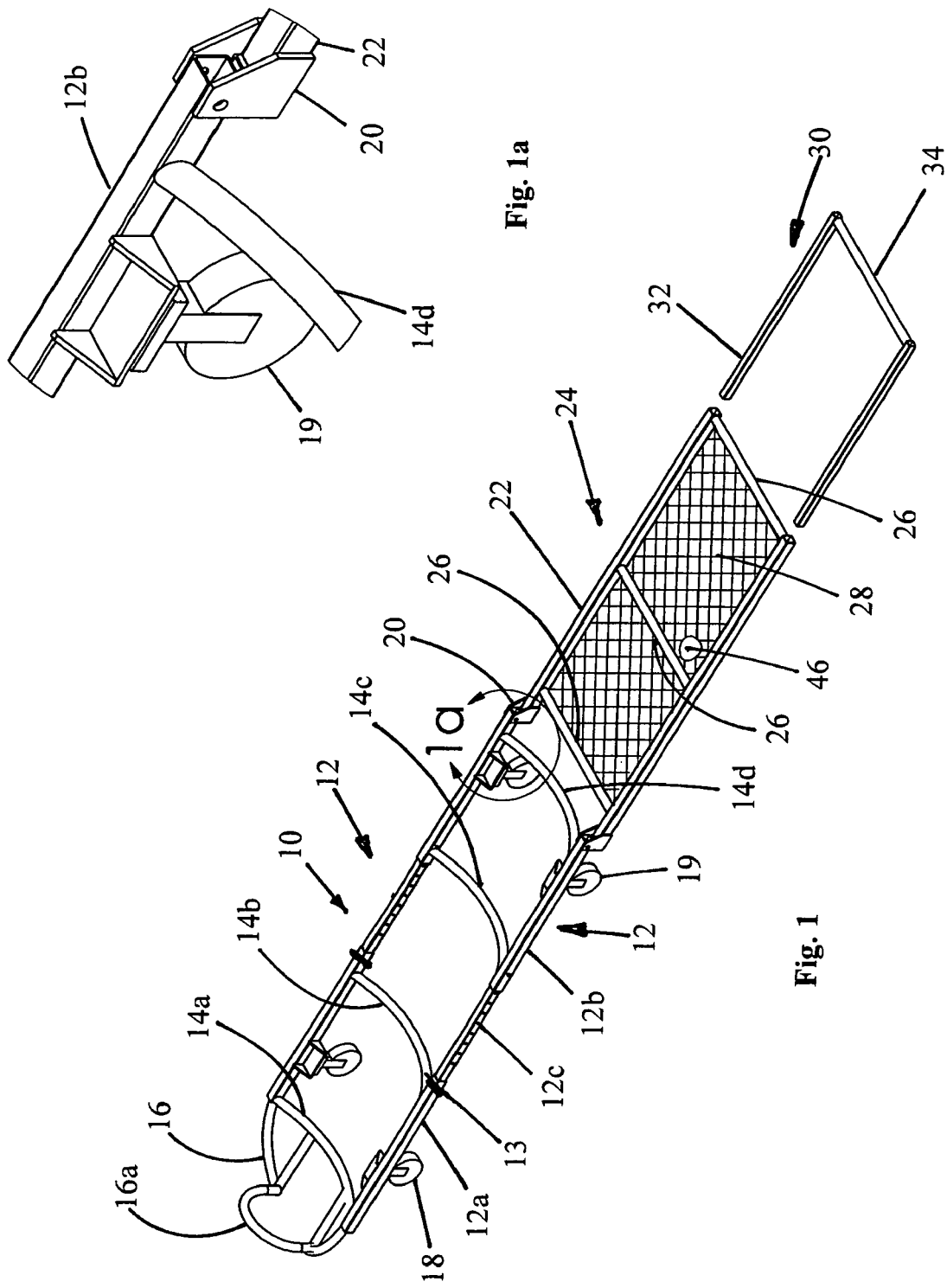
FIG. 1 is a perspective view of the dolly, and also shows a movable extension member.
Figure 2:
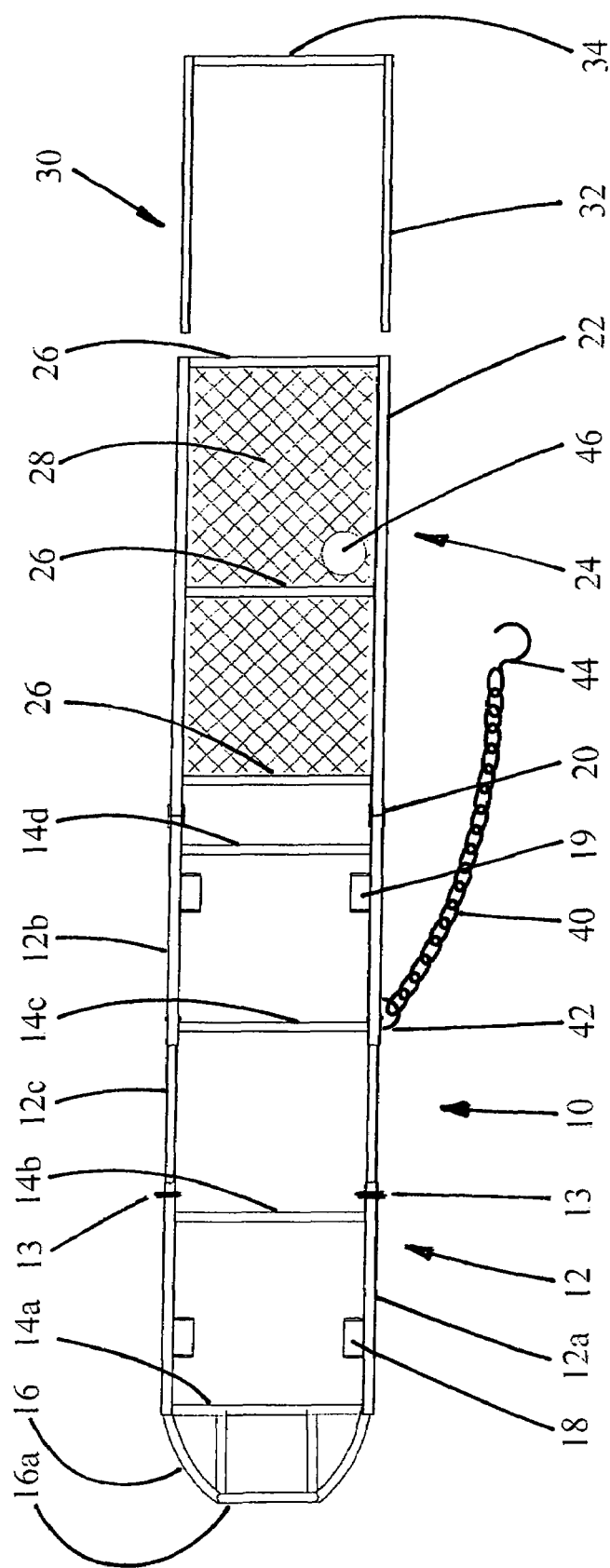
FIG. 2 is a plan view of the dolly including the movable extension member.

Referring to FIGS. 1 and 2, the dolly has a primary section, indicated at 10, that comprises two parallel, longitudinal side members 12 of square section steel tubing, joined by support means including three cross members 14a, 14b, 14c, and a rear cross member 14d. These cross members are upwardly concave so as to provide a curved bed for the carpet roll, with the side members 12 being higher than the central portions of the bed so that the roll tends to be held laterally on the dolly and does not roll off. The position of the carpet roll C is indicated in FIG. 3, and it will be seen that this primary section supports a first major portion of the carpet roll along a substantial part of its length.

The primary section 10 may be inextensible, in which case it is preferably at least 7 feet in length, and more preferably at least 7 ½ feet in length, to support the major length of a 12 foot carpet roll. However, in the preferred embodiment shown, the primary section is made extendible from a length of 6 feet, out to 7 feet 8 inches, by having each of its side members formed of telescoping portions, so that in each case the primary section can support a 7 foot length of the carpet roll. The telescoping portions include an outer, hollow front portion 12a, an outer hollow rear portion 12b, and an inner connecting portion 12c which is slidable in one or both outer portions. Pins such as that shown at 13 are used to secure the portions together.

A first or front end of the primary section 10 has an end member 16 connecting ends of the side members and which projects above the level of the bed to provide a stop member 16a for locating a front end of the carpet roll. This first end of the primary section is also provided with a pair of ground-engaging caster wheels 18, and similar wheels 19 are provided at the second or rear end of the primary section, being supported by brackets welded to side member portions 12b.

The rear ends of the side members 12 are provided with hinge brackets 20 to which are pivotally connected the front ends of side members 22 of the secondary section indicated at 24. These side members 22 are also of square-section tubing, and are connected by three straight cross members 26. The space between the side members 22 is occupied by a wire mesh or the like, indicated at 28, to provide a support surface for articles needed in carpet installation when this area is not carrying part of a carpet roll. The pivotal connection between the front ends of members 22 and the second end of the primary section allows the secondary section to be pivoted upwardly through 180°, from the lowered position shown in FIGS. 1 to 3 in which this provides a longitudinal extension of the primary section 12, to the stored position overlying the primary section as shown in FIG. 5. The secondary section is preferably about 5 feet in length for a 12 foot carpet roll, and in any case is long enough to support a substantial part, for example at least a third, of the length of the roll.

The drawings also show a movable extension member 30 which is a U-shaped member having side members or legs 32 connected at outer ends by a cross member 34. The side members 32 are sized to telescope into the outer end portions of the secondary section side members 22. In this way, the member 34 can form an extension of the secondary member 24 and provides additional leverage for bending the carpet roll, as will be described.

Another feature of the apparatus is a flexible element in the form of a chain 40 which has an inner end connected to a loop 42 welded to the outer side of one of the side members 12b, and has its outer end provided with a hook 44 which can be inserted into an aperture 46 in the mesh 28. This chain is used as a tension element to hold the secondary section in raised condition, as will be described below. A rigid member could also be used.

In operation, a carpet roll C, typically 12 feet in length, is loaded onto the dolly with one end contacting the stop member 16, and with the other end coming to within about 6 inches of the outer end of the secondary section 24. In this condition, the movable extension member 30 may have its legs 32 inserted into the outer ends of the side members 22 and be used to help move the dolly. When it is required to fit the roll into an elevator or other confined space, the movable extension member 30 member provides leverage for an operator to lift the section 24 to the raised condition shown in FIG. 4, while at the same time another operator applies downward pressure on a central area of the roll to cause this to bend as shown in FIG. 4. By such means the overall length of a 12 foot carpet roll, meaning its length as projected onto a horizontal plane, can be reduced to less than 7 ½ or 8 feet, typical of the length of an elevator, and if necessary can be reduced to about 6 feet. When the secondary section has reached the required raised position it can be held in place by means of the chain 40 which is caused to engage the aperture 46.

It will be appreciated that a bent carpet roll having an overall length of say 7 ½ feet can be fitted into an elevator of less than 7 feet by placing it diagonally.

FIG. 5 shows the dolly as folded for storage. The secondary section 24 has been folded 180° from the extended position of FIG. 3, and the movable extension member 30 has outer ends of its legs 32 inserted into sockets 34 welded to the hinge brackets 20 connecting the two sections, as best seen in FIG. 5a, such that member 30 projects upwardly and can be used to manipulate the dolly.

We claim:

1. A dolly for moving a bendable roll of material, including a roll of 12 foot length, and for facilitating the bending of the roll, including:
    a) a primary section capable of supporting a first portion of said roll at several locations along its length which first portion is at least 7 feet in length, said primary section having first and second ends, and having ground-engaging wheels adjacent each of said ends;
    b) a stop member at the first end of said primary section and adapted to limit lengthwise movement of the roll along said primary section,
    c) a secondary section pivotally connected to the second end of said primary section and having side members connected by cross members capable of supporting a second portion of said roll which is at least one-third the length of a 12 foot roll, said secondary section being pivotally movable relative to the primary section between:

1) a lowered position, in which the secondary section provides a longitudinal extension of the primary section,
  2) a raised position, such that a bendable roll resting on both sections of the dolly may be bent at a central area by lifting the secondary section from the lowered to the raised position while applying downwards force to said central area, with the secondary section providing leverage for bending the roll, and
  3) a stored position wherein the secondary section is folded flat on top of the primary section to reduce the overall length of the dolly for storage; and
  d) a tension element for connecting the primary and secondary sections to hold the secondary section in said raised condition.

2. A dolly according to claim 1, wherein the tension element for holding the secondary section in the raised position is a flexible element capable of connecting spaced parts of the primary and secondary sections.

3. A dolly according to claim 1, wherein said primary section includes side members joined by support means which provide a bed for the roll, the primary section side members being higher than central portions of the bed to assist in holding the roll laterally in place on the dolly.

4. A dolly according to claim 1, wherein said dolly is provided with a removable U-shaped extension member, said extension member being adapted to be positioned selectively in a first position, where said legs fit onto an outer end of said secondary section and said extension member forms an extension of the secondary section to thus provide additional leverage for raising the secondary section while bending said roll, and in a second position in which said legs fit onto brackets connected to said primary section from which said extension member projects upwardly and provides an upwardly extending handle for moving the dolly.

5. A dolly according to claim 1, in which said primary section includes at least two telescoping portions.

6. A process for bending a carpet roll to enable the roll to fit within a confined space, comprising the steps of:
  a) placing said roll on a dolly having a primary section and a secondary section, said primary section being capable of supporting a first portion of said roll which portion is at least 7 feet in length, said primary section having first and second ends and having ground-engaging wheels adjacent each end, and the secondary section being pivotally connected to the second end of the primary section and being capable of supporting a second portion of said roll, said secondary section being pivotally movable relative to the primary section,
  b) lifting said secondary section pivotally from a lowered position, in which the secondary section provides a longitudinal extension of the primary section, to a raised position by utilizing leverage provided by said secondary section during lifting and simultaneously applying downwards force to a central portion of the roll to cause the roll to bend, whereby the overall dimensions of the roll are altered to allow it to fit into said confined space.

7. A process according to claim 6, wherein, after the secondary section has been lifted, it is secured in its raised position by a flexible or rigid tension element connecting the sections.

8. A process according to claim 6, wherein the step of lifting the secondary section is achieved by attaching a removable extension member to said secondary section to provide additional leverage.

* * * * *